March 24, 1959     A. W. KOBYLINSKI     2,879,089

POSITIVE CABLE TERMINAL NUT LOCKING DEVICE

Filed July 9, 1956

INVENTOR.
Alfred W. Kobylinski

ATTORNEYS

United States Patent Office 2,879,089
Patented Mar. 24, 1959

2,879,089

POSITIVE CABLE TERMINAL NUT LOCKING DEVICE

Alfred W. Kobylinski, Morton, Pa., assignor to the United States of America as represented by the Secretary of the Navy Application July 9, 1956, Serial No. 596,802

2 Claims. (Cl. 287—75)

(Granted under Title 35, U. S. Code (1952), sec. 266)

The invention described herein may be manufactured and used by or for the Government of the United States of America for governmental purposes without the payment of any royalties thereon or therefor.

This invention relates to nut locking assemblies. In many fields of mechanics, fastening and locking nuts are used in devices which impart not only longitudinal or transverse stresses to the nuts but also rotational stresses or forces tending to unscrew such elements.

Of the prior art devices, the most common mechanism in anchoring the end of a cable under such stresses consists of the conventional adjusting nut which is then anchored by a locking nut screwed adjacent the adjusting nut in a close mating relationship. This type of construction is well known. The system however, is unable to maintain its adjustment under severe complex loading conditions.

A primary object of this invention therefore is a cable terminal locking means which maintains its adjustment under any type of stress condition.

Other objects and advantages will be readily apparent to those skilled in the art from an examination of the following specification and drawing wherein.

Figure 1:
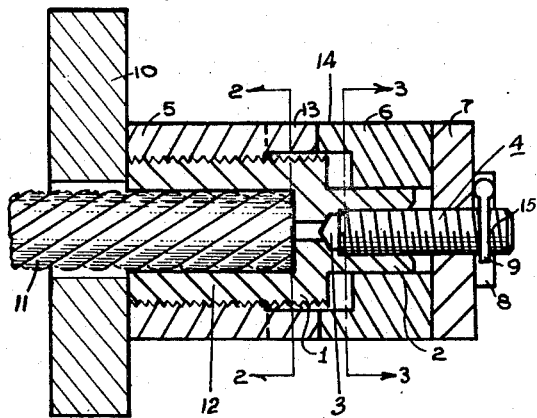
Figure 1 is a cross-sectional view of the entire assembly in combination.

Referring to Figure 1, end of cable 11 passes through boss 10 mounted on a catapult grab. Secured to the cable end 11 is a terminal cable fitting 1. The fitting comprises a large diametered forward section 12 and a smaller rearward section 2; body 12 is cylindrical while section 2 is a square prismoid. A port 3 is drilled concentrically and longitudinally of the fitting and a female thread is formed therein. Exteriorly of section 12 a male thread is machined thereon.

Figure 2:
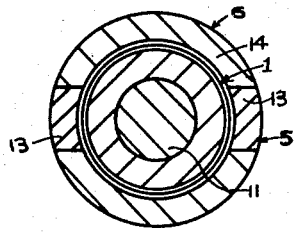
Figure 2 is a sectional view along lines 2—2 of Figure 1.

Referring to Figures 1 and 2, a terminal locknut 5 having a mating screw portion therein is threaded over the cable terminal; lugs 13 protrude rearwardly facing the terminal lock 6.

Figure 3:
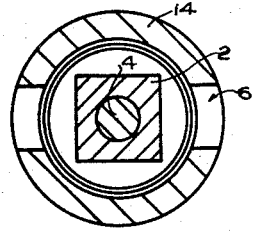
Figure 3 is a sectional view along lines 3—3 of Figure 1.

Referring to Figures 1 and 3, the lock 6 is slipped over section 2 of the cable terminal abutting the terminal locknut 5; matching lugs 14 on the lock 6 bridge the gaps associated with lugs 13.

A threaded stud 4 is screwed into the port 3 and protrudes about half its length beyond the end of the cable terminal.

Figure 4:
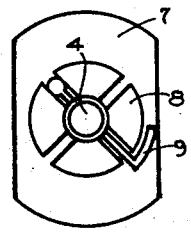
Figure 4 is an end view of Figure 1.

Referring to Figures 1 and 4, a locking plate 7 is threaded over the stud 4 and tightened insuring a mating engagement of boss 10, locknut 5, lock 6, and plate 7. A series of gapped flanges 8 formed on the face of the plate have at all times one of the gaps in alignment with a transverse port 15 in the stud allowing a cotter pin 9 to be inserted.

In operation, the cable terminal 1 is brought adjacent boss 10; rotation of lock nut 5 either shortens or lengthens the effective length of the cable depending upon the direction of rotation. The lock 6 prevents rotation of the nut 5 while plate 7 prevents any longitudinal movement of the mating parts.

Longitudinal movement of the units relative to each other is prevented by the mating threaded portion of members 5 and 12, the mating of threads on the stud 4 and plate 7, and the retaining force of the cotter pin. Rotational movement of the units relative to each other is prevented by the mating of lock teeth 14 and the rotational restraint by pin 9 upon the plate 7.

It is thus evident that the above locking system provides positive anchoring of the fastening members to the point of the material failure of the cable terminal and its associated elements, while at the same time no additional complexity has been added to impair assembly or disassembly.

Obviously many modifications and variations of the present invention are possible in the light of the above teachings. It is therefore to be understood that within the scope of the appended claims the invention may be practiced otherwise than as specifically described.

What is claimed is:

1. In combination, a cable, a boss, an end of said cable freely passing through said boss, a terminal fitting attached to said cable end, adjusting means encircling said end and abutting said boss for altering the effective length of said cable, lock teeth on said adjustment means, a lock nut encircling said terminal having mating lock teeth for said previously recited lock teeth whereby upon mating of said lock teeth rotational movement of the lock nut is prevented, a stud projecting from the end of said terminal, a locking plate secured to said stud, means for maintaining the nut and adjustment means in direct contact and preventing any longitudinal movement of the mating parts whereby the said combination provides positive anchoring of the fastening members not only to longitudinal or transverse stresses but also to rotational stresses while at the same time no additional complexity has been added to impair assembly or disassembly.

2. A combination according to claim 1 further including a port drilled in said stud, spaced teeth on said plate, and a cotter pin inserted in one of said spaces and through said port.

References Cited in the file of this patent

UNITED STATES PATENTS

| | | |
|---|---|---|
| 280,125 | Brauchler | June 26, 1883 |
| 1,317,058 | Wiley | Sept. 23, 1919 |
| 1,677,326 | Bowen | July 17, 1928 |
| 1,870,833 | Burr | Aug. 9, 1932 |
| 2,544,712 | Miller | Mar. 13, 1951 |
| 2,693,587 | Davidson | Nov. 2, 1954 |